April 28, 1970 — W. A. WARE — 3,508,835
MEASURING MICROSCOPE

Filed Aug. 1, 1966 — 4 Sheets-Sheet 1

INVENTOR.
WILLIAM A. WARE
By White & Haefliger
ATTORNEYS.

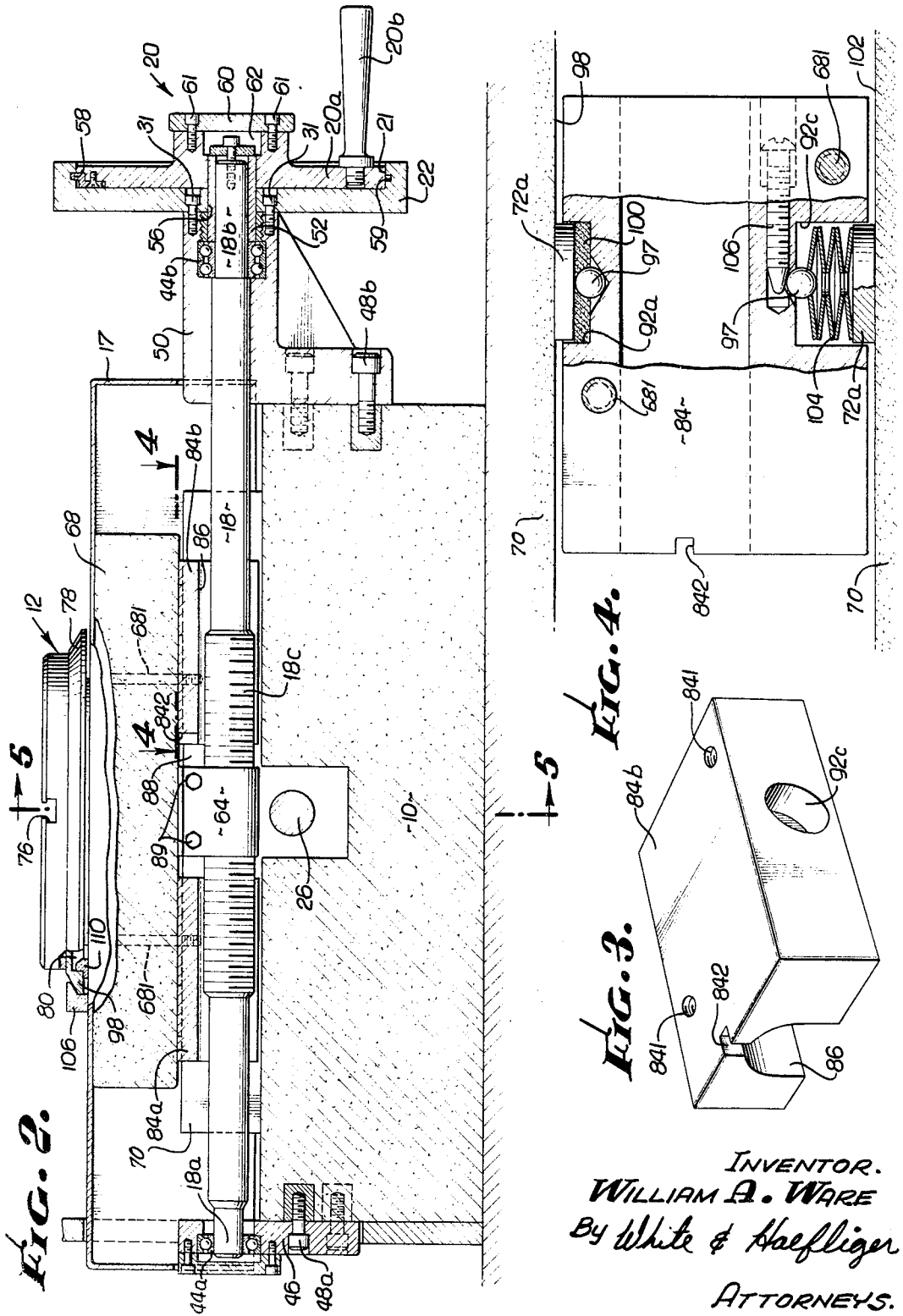

April 28, 1970   W. A. WARE   3,508,835
MEASURING MICROSCOPE
Filed Aug. 1, 1966   4 Sheets-Sheet 3
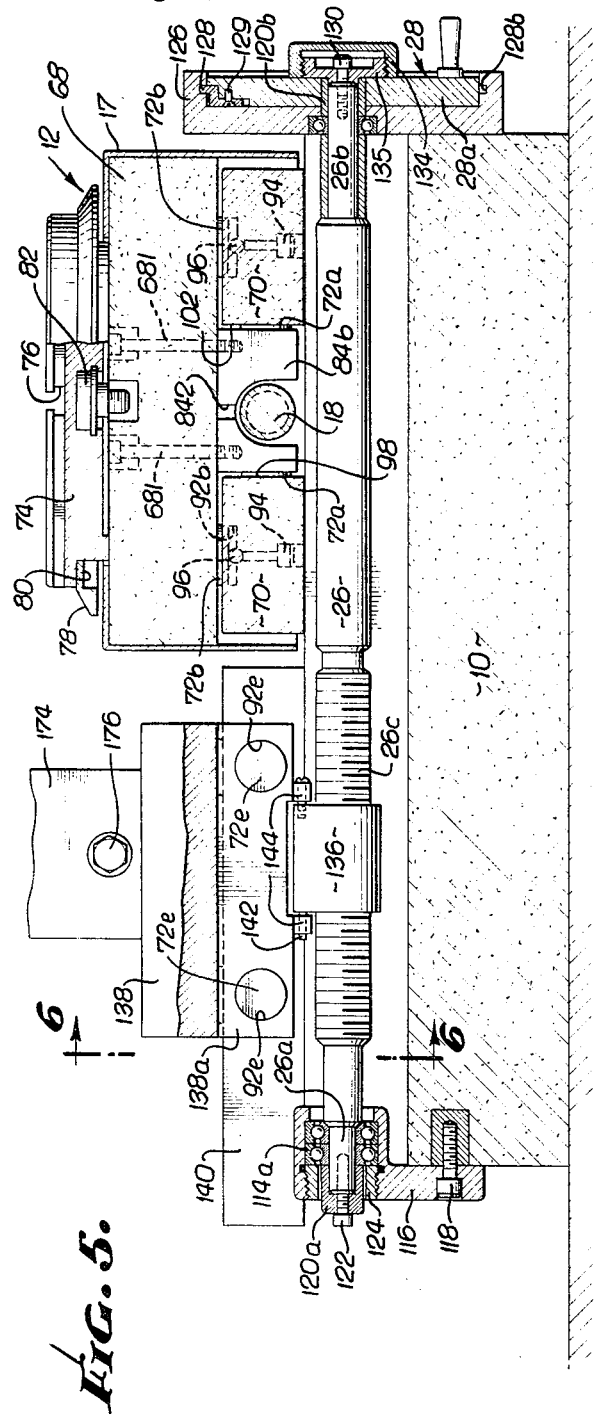
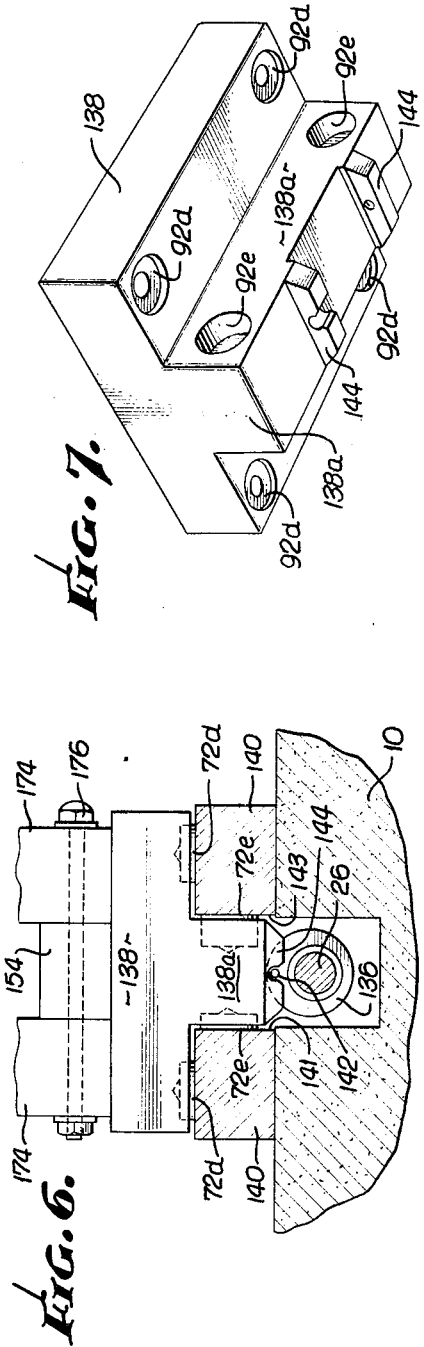
INVENTOR.
WILLIAM A. WARE
By White & Haefliger
ATTORNEYS.

April 28, 1970 W. A. WARE 3,508,835
MEASURING MICROSCOPE
Filed Aug. 1, 1966 4 Sheets-Sheet 4
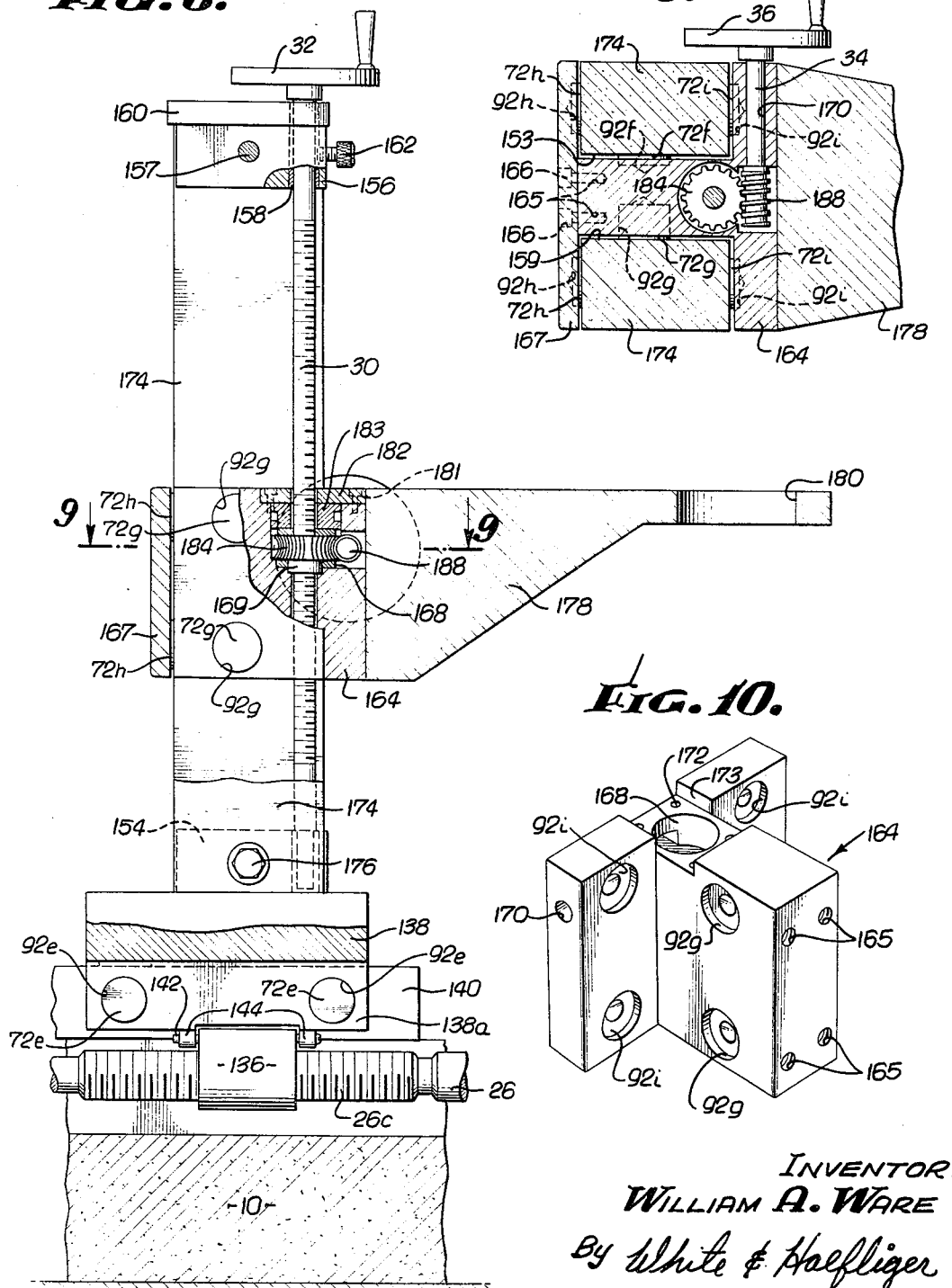
INVENTOR.
WILLIAM A. WARE
By White & Haefliger
ATTORNEYS.

United States Patent Office 3,508,835
Patented Apr. 28, 1970

3,508,835
MEASURING MICROSCOPE
William A. Ware, South Pasadena, Calif., assignor, by mesne assignments, to Rusco Industries, Inc., Los Angeles, Calif., a corporation of Delaware
Filed Aug. 1, 1966, Ser. No. 569,379
Int. Cl. G01b 11/00, 11/04
U.S. Cl. 356—170                                16 Claims

ABSTRACT OF THE DISCLOSURE

The disclosure concerns guiding and moving mechanisms for apparatus such as optical devices, enabling movement of an optical objective in three mutually perpendicular directions, and with extreme accuracy.

---

This invention has to do with optical devices for use in the measurement of extremely small increments of distance and more particularly, is concerned with an optical device for the measurement of work in which independent adjustability is afforded along each of three mutually perpendicular $x$, $y$ and $z$ paths, the $x$ and $y$ paths being generally horizontal, and the $z$ path being generally vertical.

Optical measuring devices are known in which the stage on which the work is displayed has been movable in two directions, that is, along one horizontal path, side to side, (the $x$ path) and a second horizontal path, from front to rear, (the $y$ path). For viewing, an objective is spaced above the stage and provided with an eyepiece movable vertically for the purpose of focusing. In the measurement of ultra small distances on the order of hundredths of thousandths of an inch, the provision for both $x$ and $y$ path adjustment of the stage has resulted in error introduction, in that adjusting along the one path can upset the previously achieved adjustment along the other path.

In the present invention, the stage is movable along only one horizontal path and the pedestal on which the objective is carried for vertical adjustment is itself horizontally movable so that it is unnecessary to attempt two-directional adjustment of the stage.

A further problem in presently known optical measuring apparatus is that phenomenon attributable to the inertia and surface friction developed by two contacting bodies which must be overcome when surfaces are required to move. It is found that movement of one body relative to the other is not smooth but occurs in jumps which results in over-adjustment and a series of back and forth adjustment in an effort to achieve exact alignment.

It is an object of the present invention to provide an optical device for work measurement in which $x$, $y$ and $z$ path alignment of the cross hairs in the objective with a work target is accomplished without interdependency and in which the above problem is substantially completely obviated and consequent errors and delays are minimized.

The optical device of the present invention basically provides independent adjustment along each of three mutually perpendicular $x$, $y$ and $z$ paths, the $x$ and $y$ paths being generally horizontal and the $z$ path being generally vertical, and includes a base, a stage supported by the base for display of the work and means to move and guide the stage along one horizontal path, a pedestal extending upwardly relative to the base and means to move and guide the pedestal along the other horizontal path and independently of the stage, an objective carried by the pedestal, and means to move and guide the objective along the $z$ path including two interfitting drives, respectively individually operable for coarse and fine adjustment of the objective along the $z$ path. As will be seen the stage and pedestal moving and guiding means may each include a pair of spaced parallel ways, a shaft parallel to the ways, and a slide block connected to the shaft for guided movement along the ways upon shaft rotation; and the objective moving and guiding means may include spaced parallel ways on the pedestal, and the drives may include a threaded third shaft for coarse $z$ path movement of the objective and extending in the $z$ direction, a fourth shaft and means interconnecting the third and fourth shafts to translate rotary movement of the fourth shaft into reduced speed vertical movement of the objective.

Further features include carbide steel pads on the slide blocks urged to engage granite ways to overcome stiction; and optical read out apparatus as will be described.

The invention will be further described as to an illustrative embodiment thereof in conjunction with the attached drawings in which:

FIG. 2 is a view in section taken on line 2—2 of FIG. 1;

FIG. 3 is a perspective view of a saddle block;

FIG. 4 is an enlarged plan view of the saddle block taken along line 4—4 in FIG. 2 and partly broken away to show underlying parts;

FIG. 5 is a view in section taken on line 5—5 of FIG. 2;

FIG. 6 is a section taken on line 6—6 in FIG. 5;

FIG. 7 is a perspective view of the pedestal displacing slide block;

FIG. 8 is a side elevation view of the pedestal partly broken away to show underlying parts;

FIG. 9 is a section taken on line 9—9 in FIG. 8;

FIG. 10 is a perspective view of a $z$ path slide block;

Figure 1:
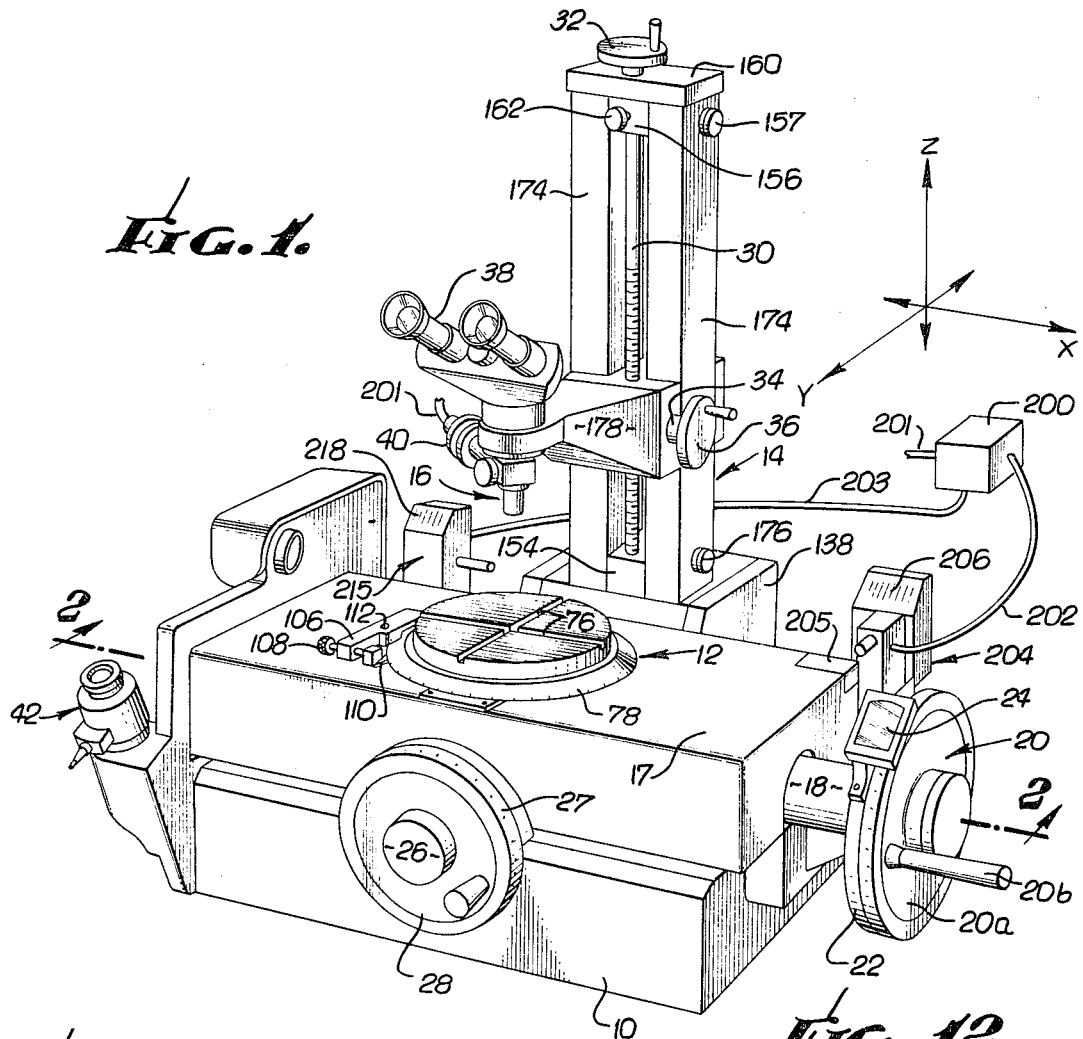
FIG. 1 is a perspective view of the optical device of the present invention.

In general, the optical device of this invention can be considered to have three mutually perpendicular paths extending along the three axes of the device in FIG. 1. For convenience in the description to follow and in the claims, these paths will be identified as $x$, $y$ and $z$. Since both the $x$ and $y$ paths are horizontal they may be considered interchangeable for purposes of the present device.

A feature of the present device is that the work to be viewed and measured is moved only along one horizontal path. Therefore, only one adjustment is necessary with respect to the work. Adjustments along other paths, $y$ (or $x$) and the $z$ path are accomplished by means independent of the work position adjusting means, so that adjustment of one does not upset a previously made adjustment of another.

A specific illustrative embodiment for achieving this advantageous independent adjustability is shown in FIG. 1. Base 10 is shown to support the stage 12 for display of the work. The pedestal 14 extending along the $z$ path supports the optics of the device, including objective 16. The stage is movable along the $x$ path, the pedestal along the $y$ path and the objective along the $z$ path. While the specific means are concealed under housing 17, the stage is moved left or right along the $x$ path by shaft 18 which is rotatable by crank 20. Indicia on the periphery of a rotary crank 20a rotatable by crank handle 22b can be read through magnifying lens 24 to obtain data on the movement of the stage. Lens is carried by a guide 22 mounted by base 10 and apertured under the lens 24 for viewing the indicia.

Similarly, the pedestal is movable front and rear along the $y$ path in response to rotation of a shaft 26 rotatable by crank 28. A scale 27 is provided for measuring this movement.

Also similar as seen in FIG. 8 is the up and down focusing movement of the objective along the $z$ path. This is achieved in response to rotation of a vertical shaft 30 rotatable by turning crank 32 for coarse adjustment. Fine adjustment is achieved in response to rotation of transverse shaft 34, rotatable by crank 36, as seen in FIG. 9.

Several optional features of the optical device are shown in FIG. 1 including a binocular eyepiece 38, light source 40 and auto-collimator 42.

Turning now particularly to FIGS. 2, 3, 4 and 5, the assembly associated with movement of the stage 12 is seen to include shaft 18 journaled at reduced diameter portion 18a in bearing 44a carried by housing 46 which is secured to the base by fasteners 48a. A right hand bracket 50 secured to the base by fasteners 48b carries the bearing 44b for reduced end portion 18b of the shaft. A sleeve 52 journaled at 56 is attached to the hand crank 20 and to the shaft 18 to engage and rotate the shaft on turning of the crank. The crank is journaled in base 21 of the scale ring 22, which is secured to the bracket 50 by fasteners 31. A tongue 58 fastened to the perimeter of crank rotor 20a tracks in an annular groove 59 in bore 21 to retain rotor 20a axially. An end plate 60 is mounted with fasteners 61 over the central aperture 62 in the crank 20.

A follower nut 64 is thread connected on threaded portion 18c of the shaft to underlie the stage and the slide block 68 on which the stage rests. A pair of parallel ways 70 secured to base 10 guide and support the slide block for x path movement. At the interface of the slide block and the ways, pads 72, to be hereinafter described, are provided to facilitate stiction-free adjustment of the stage position. The stage itself comprises display plate 74 provided with intersecting fixture mounting T-slots 76, a rim portion 78 and underlying recess 80, and is rotatably secured at the top surface of the slide block as by partly threaded fastener 82 threaded into the slide block.

The slide block may be considered to include saddle blocks 84a and 84 overlying the shaft on either axial side of the follower nut. One of these blocks is shown in FIG. 3 as generally rectangular and provided with an inclusive axial channel 86 on the underside to receive the shaft 18. Each saddle block is tapped at 841 to receive fasteners 681 extending from the main body of the slide block thereby to fasten the blocks securely together. A notch 842 is provided on the opposing saddle block faces to receive follower stop 88 fastened at 89 to the follower nut to prevent rotational movement of the nut. A recess 92a is provided in each side of the saddle block to receive pad 72a, to be described later.

As best seen in FIG. 5 the ways 70 are also provided with bores or recesses 92b to receive support pads 72b. A set screw 94 projects into each recess 92b to adjust, by bearing on ball 96, the projection of pad 72b beyond the plane of the way's upper face thereby to enable absolute leveling of the slide block.

At the interface of the saddle block side walls and the way's side walls, additional pads 72a are provided. As best seen in FIG. 4, master way surface 98, which parallels the x axis as closely as possible, is spaced from the opposing saddle block surface by pad 72a partly received in recess 92a of the saddle block. Ball 97 initially allows the pad to pivot into flat surface engagement with master surface 98 before cement 100 is allowed to set. The hardened cement then locates the pad 72a in exact guiding position. Cement 100 may consist of substances such as thermoplastic or thermosetting adhesives, as for example phenoxies and epoxies, e.g. those based on copolymers of bisphenols such as 2,2-bis(4-hydroxyphenyl) propane and epichlorohydrin hardened as necessary by reaction with polyfunctional amines, acids or anhydrides. The nonmaster way surface 102 is also spaced from the opposing saddle block surface by a pad 72a, which is resiliently mounted in recess 92c by spring 104 such as a Belleville spring stack. Set screw 106 acting through ball 97 permits adjustment of the pad pressure against way surface 102.

Undesired rotation of the stage is prevented by engaging the rim portion 78 thereof between grippers 106 and 110. The latter are pivoted at 112 to pinch the rim portion 98 in response to operation of a screw 108 to reduce the desired scissors action and pinching effect, as seen in FIG. 2.

In operation, the stage is adjusted along the x path by turning crank 20 and thereby rotating shaft 18. Follower nut 64, prevented from rotation by engagement of follower stops 88 in notches 842 moves axially along the shaft, moving saddle block 84a or 84b ahead of it. Slide block 68 moves with the saddle block shifting the position of the stage. It will be noted that some lost motion is enabled in stage adjustment by forming follower stop 88 with less projected extent than the depth of notches 842 in the saddle blocks. Such lost motion allows for crank extension before the stage is moved, whereby chance of crank and stage overtravel is lessened.

Turning now particularly to FIGS. 5, 6 and 7, the assembly associated with movement of the pedestal 14 is seen to include shaft 26 journaled at a reduced diameter shaft portion 26a in bearing 114a carried by housing 116 which is secured to the base by fastener 118. The shaft end 26a is secured against rightward displacement in FIG. 5 by connection at 122 to sleeve 120a engaging bearing 114a, the latter is retained at 124. Shaft rotation is accomplished by turning crank 28 which is journaled in ring 126 secured to the base 10. Tongue 128, fastened to the perimeter of crank rotor 28a as by fastener 129 tracks in annular groove 128b in ring 126 to retain the rotor 28a axially. A second sleeve 120b extending from the hand crank is fastened at 130 to the reduced shaft portion 26b and to the rotor 28a to rotate the shaft on turning of the crank. Cap 134 is threaded on bushing 135 to cover the fastener 130.

A follower nut 136 is screwed on the threaded portion 26c of the shaft to underlie the pedestal and the pedestal slide block 138 on which the pedestal rests. A pair of parallel ways 140 secured to the base 10 guide and support the pedestal slide block for y path movement. At the interface of the pedestal slide block and ways, pads 72d and 72e again to be hereinafter described, are provided to facilitate adjustment of the pedestal position.

As best seen in FIG. 7 the pedestal slide block is provided with recesses 92d and 92e to receive pads 72d and 72e in the manner of the saddle block previously described. Two pads 72e carried by the stem 138a of block 138 are cemented in place in recesses 92e and bear on the pedestal transport way master surface 141, parallel to the y axis. The other pair of pads 72e are resiliently mounted and bear against the nonmaster way surface 143 with a controllable pressure as explained above in FIG. 4. Additional pads 72d are received in recesses 92d in block 138 and bear against the top surfaces of the pedestal transport ways 140 with adjusting screws (not shown) being provided in block 138 for leveling in the manner of set screw 106 in way 70.

The follower nut 136 is secured to the pedestal slide block and against rotation by pin 142 passing through depending ears 144 (FIG. 7) of the pedestal slide block.

In operation, the pedestal is adjusted front to back along the y path by turning crank 28 and thereby rotating shaft 26. Follower nut 136, prevented from rotation by pin 142, moves axially along the shaft advancing the pedestal slide block. The pedestal verticar ways 174, fastened to the slide block flange 154 by pin 176, move with the block and follower, shifting the pedestal position and thereby the y path horizontal position of the objective. It will be noted in FIG. 5 that lost motion in the adjustment may be provided by having follower 136 less wide than the space between ears 144. This free travel space permits pick-up of the block 138 without overtravel of the crank that would misadjust the slide block, pedestal and objective.

Turning now particularly to FIGS. 8, 9 and 10, the assembly associated with the objective are seen to include shaft 30 journaled at its lower end in flange 154 of the pedestal slide block, and at its upper end by bearing 158 carried in spacing block 156. The shaft extends through crosspiece 160 to terminate at crank 32. Shaft rotation is accomplished by turning crank 32, as a set screw 162 threaded in block 156 may be operated to selectively lock the shaft against rotation.

Objective slide block 164 is mounted on shaft 30 to be axially movabue vertically along the shaft. As best shown in FIGS. 9 and 10, the objective slide block is T-shaped and tapped at 165 to receive fasteners 166 extending through mounting plate 167 to secure the plate to the slide block. The block is further tapped at 172 to receive fasteners 181 holding cover plate 182 in recess 173. A central vertical bore 168 in the slide block is adapted to receive the shaft 30 a follower nut 169 and a nut retainer 183. The follower nut 169 is thread connected on the shaft 30. An additional bore 170, tangential to bore 168, is provided leading from the side of the slide block to the shaft bore, for purposes as will appear.

A pair of parallel ways 174, resting on pedestal slide block 138 and secured to flange 154 thereof by pin 176 passing through the ways and flange, extend vertically upward from the device base 10 to form the pedestal. The ways are spaced an equal distance at their upper extension by the spacing block 156 secured by pin 157. Pads, to be hereinafter described, are provided between the ways and the slide block and plate 167 to facilitate adjustment of the objective position. As best seen in FIG. 9, pads 72f are secured in place in recess 92f and bear on the master way surface 153, parallel to the z axis, and pads 72g are resiliently mounted in recesses 92g and bear against the nonmaster way surface 159 with controllable pressure, as described in FIG. 4. Likewise, pads 72h and 72i, respectively carried in recesses 92h and 92i in plate 167 and block 164, engage the ways 174 as illustrated to exactly locate and guide the slide block.

Attached to the slide block to support the objective is yoke 178 having a bore 180 through which the lens system extends as shown in FIG. 1.

Circumscribing and in threaded engagement with the shaft 30 is spur gearing 184 on nut 169 disposed in recess 168 of the objective slide block. A worm extension 188 of shaft 34 extending within the bore 170 and rotatable by crank 36 is in engagement with the gear 184 so that turning of the crank 36 rotates worm 188 and rotates the gear 184 to effect speed reduced vertical movement of follower nut 169 and the objective. The worm and gear are thus arranged for fine vertical adjustment of the objective after coarse adjustment thereof in the z path by turning crank 32. To prevent coarse adjustment movement during fine adjustment, set screw 162 is tightened against the shaft 30.

A particular feature of the present apparatus is the use of parallel ways as part of the guide means for the moving portions of the device and the further provision of pad means at the sliding interfaces. Accuracy and efficiency in use of the present optical device is greatly enhanced by minimizing problems concerning lack of smooth movement of such portion by means of these pads and ways. Such problems are measurable in terms of disparities between static and kinetic friction coefficients for the sliding surface. In the present apparatus this disparity can be greatly reduced or even eliminated. This is possible by employing at sliding interfaces, surfaces which are the same or closely approximate in both static and kinetic co-efficients of friction. It has been found that a combination of materials having certain hardness and porosity characteristics will minimize or eliminate differences in such coefficients and their effects. In particular, a hard metal, lapped or polished to a smooth surface, is highly useful as a pad means, especially hardened steels, e.g. steels containing 0.85% to 1.5% or more carbon and particularly these steels having a Brinell hardness of 225 or greater and polished to about 0.9 to about 1.5 RMS microinch finish. The parallel ways are desirably hard and also possessed by some minute porosity to permit an air bearing relation between the pad and the way surface. A suitable material is granite, feldspar or quartz or, in general, a mineral having a Mohs' hardness above about 5.5. Tests have shown the static and kinetic coefficients of friction of carbide steel and granite to be equal in the range of 0.111 and 0.117 if washed with a surfactant and between 0.125 and 0.127, if organic solvent washed. No lubricants are necessary at the interfaces and their use is desirably avoided since differential coefficients of friction can be introduced by the lubricants themselves.

Combinations of metals and minerals having static and kinetic coefficients of friction within 0.010 units of one another are preferred as pad and way materials. Of course the pad and ways can be mineral and metal respectively, that is, reversed from the arrangement described.

Figure 11:
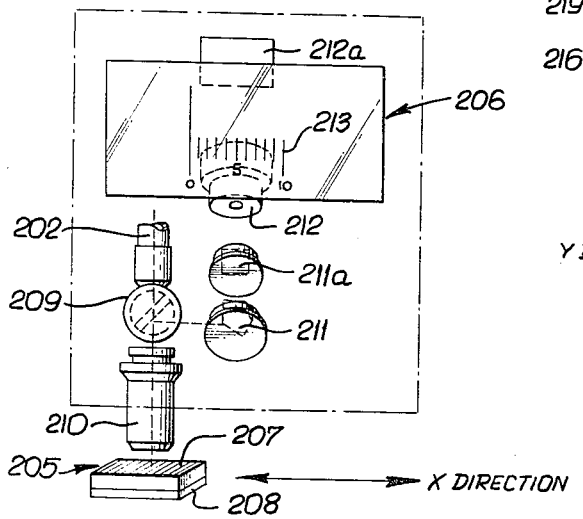
FIG. 11 is a schematic of an optical read-out system for reading the $x$ scale.
Figure 12:
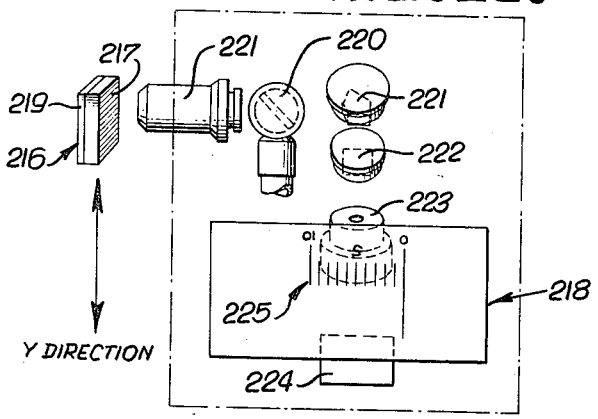
FIG. 12 is a view like FIG. 11 of a system for reading the $y$ scale.

Referring now to FIGS. 1, 11 and 12, a light source is seen at 200, with three fiber optics light pipes 201, 202 and 203. Pipe 201 is connected with the assembly 40 at the eye-piece for delivering light to furnish internal illumination for the microscope.

Light pipe 202 is connected with the optical means indicated at 294 operable to project light data from a body 205 incorporating a scale to a read-out display 206. Body 205 is shown as carried by the slide block 68 in FIG. 1, to be movable along the x-direction with stage 12.

FIG. 11 shows the body to incorporate an x-scale 207 and a mirror 208. Light from the pipe 202 is directed to a beam splitter 209. Light passing through the splitter is beamed via objective 210 onto the movable scale 207, and reflected at 208 back to the splitter. The latter is partially silvered to reflect light from the scale 207 to the pentaprism 211, the rays then passing to another mirror 211a, through a projector lens 212, and to another mirror 212a for imaging the movable scale at the fixed reticle scale 213 for display comparison purposes. As a result, the user may keep his eye at the eye-piece 38, and need only glance at display 206, to determine the extent to which crank handle 20b need be rotated, whereby the lead screw 18c need not be of expensive precision construction.

Light pipe 203 is similarly connected with the optical means indicated at 215 operable to project light data from a body 216, seen in FIG. 12 to incorporate a scale 217 to a read-out display 218. Body 216 is carried by slide block 138 operable along the y-direction in respense to operation of crank 28.

FIG. 12 shows the body 216 as incorporating a mirror 219 as well as scale 217. Light from pipe 203 passes via splitter 220 and objective 221 onto the movable scale 217, following which it is reflected back to the splitter. The latter passes the reflected light which then passes via pentaprism 221, mirror 222, projector 223 and mirror 224 to image the movable scale 217 at the fixed reticle scale 225 for display comparison purposes. As a result the user may keep his eye at the eye-piece 38, and need only glance at display 218 to determine the extent to which crank 28 need be rotated, whereby lead screw 26c need not be of precision construction.

I claim:

1. Optical device for measurement of work, said device having independent adjustability along each of three mutually perpendicular x, y and z paths, the x and y paths being generally horizontal and the z path being generally vertical, said device including:
   a base;
   a stage supported by the base for display of the work and means to move and guide the stage along one horizontal path;
   a pedestal extending upwardly relatively to the base and means to move and guide the pedestal along the other horizontal path and independently of the stage;
   an objective carried by the pedestal and means to move and guide the objective along said z path, said guide means being on the pedestal and including a flat way having z direction elongation and comprised of stone, a body supporting the objective, a metallic pad flatly engaging the way to block entrance of dirt between the pad and way, and a force exerting element urging said body toward the way so that side loading is exerted from the body to said way via said pad as the pad slides along said way;

said means to move the objective including two interfitting drives respectively individually operable for coarse and fine adjustment of the objective along said z path, one of said drives supporting said body.

2. Optical devices as claimed in claim 1 in which the stage and pedestal moving and guiding means each include a pair of spaced parallel ways supported on the base, a shaft extending parallel to the ways and a slide block operatively connected to the shaft for guided movement along the ways upon rotation of the shaft.

3. Optical device as claimed in claim 2 in which said drives include a threaded third shaft for coarse z path movement of the objective and extending parallel to said way, a fourth shaft, and means operatively interconnecting said third and fourth shaft to translate rotary movement of the fourth shaft into reduced speed vertical movement of the objective.

4. Optical device as claimed in claim 1 in which said stone way comprises a first mineral surface having a Mohs' hardness of at least 5.5 and said pad has a surface engaging said stone way and having a Brinell hardness of at least 225.

5. Optical device as claimed in claim 1 in which said drives include hand cranks and read-out means for displaying the amount of rotational movement of the cranks.

6. Optical device as claimed in claim 1 in which the stage comprises an upwardly facing axially rotatable disc having a rim portion and including locking means carried by the base to grip said rim portion and releasable to allow disc rotation to selected rotary position.

7. Optical device as claimed in claim 1 in which said moving and guiding means include:
 a first pair of horizontal, spaced parallel ways supported on the base and extending along one of said x and y paths,
 a first threaded shaft parallel and adjacent to the first pair of ways,
 a first slide block to support the stage and slidable along the ways,
 a first follower thread connected on the first means carried slide block to be displaced by said follower for effecting movement of the stage along said one axis in response to rotation of the first shaft,
 a second pair of horizontal, spaced parallel ways supported on the base vertically offset from the first ways and extending along the other of said x and y paths,
 a second threaded shaft parallel and adjacent to the second pair of ways,
 a second slide block to support the pedestal and slidable along the second ways,
 a second follower thread connected on the second shaft,
 and means carried by the second slide block to be displaced by said second follower for effecting movement of the pedestal along said other axis in response to rotation of the second shaft,
 a third pair of spaced, parallel ways on the pedestal and extending generally vertically along said z path, said third pair of ways being defined by said stone way and another stone way,
 a third threaded shaft parallel and adjacent to the third pair of ways,
 a third slide block defined by said body slidable between the third ways, locking means operable to secure the third shaft against rotation, and
 said drives including spur gearing thread connected on the third shaft and operable to move the third slide block along said z path in response to third shaft rotation, and a worm in engagement with said spur gearing to rotate said spur gearing on and relative to the third shaft thereby to effect speed reduced movement of the third slide block and objective along said z path.

8. Optical device as claimed in claim 7 in which the guide means include pads carried by the first and second slide blocks to forcibly and flatly engage associated ways comprised of stone.

9. Optical device as claimed in claim 8 in which the ways have granite surfaces engaged by pad surfaces consisting of carbide steel.

10. Optical device claimed in claim 8 in which one way of each pair of parallel ways defines a master surface and in which one pad engaging said master surface has fixed position with respect to the slide block, the other way of said pair being engaged by another pad, and including means reacting against said other pad and urging the slide block and said one pad toward said master surface.

11. Optical device as claimed in claim 7 in which at least one of the followers to move the stage has lost motion connection with its associated slide block.

12. Optical device as claimed in claim 3 including scale means to register rotation of the x and y path shafts, optical means to convey light data from the scale means, and read-out means to project the light data for viewing.

13. Optical device as claimed in claim 7 in which the base includes a body having a transverse channel to receive the second shaft, the first shaft being vertically offset from the second shaft, and the pedestal projects upwardly at a side of said body from which said second shaft projects.

14. In a guiding device for a head;
 (a) a pair of elongated parallel ways which are laterally spaced apart, one of said ways defined by a flat stone surface,
 (b) a head mounting carrier body located to travel longitudinally of said ways,
 (c) a metallic pad integral with said body and flatly engaging said one way at and between longitudinally opposite ends of the pad,
 (d) and yieldable means carried by said body to transmit force with reaction against the other way to urge the body toward said one way to hold the pad flatly against said one way.

15. The device of claim 14 wherein said stone way comprises granite and said pad comprises carbide steel.

16. The device of claim 14 wherein said other way is defined by a flat stone surface, and including another pad urged by said spring against said other way surface.

References Cited

UNITED STATES PATENTS

| | | | |
|---|---|---|---|
| 1,968,094 | 7/1934 | Ott | 350—84 |
| 2,146,906 | 2/1939 | Moller. | |
| 2,342,828 | 2/1944 | Armitage et al. | |
| 2,705,374 | 4/1955 | Cattell et al. | 350—84 |
| 3,166,626 | 1/1965 | Vargady. | |

RONALD L. WIBERT, Primary Examiner

T. R. MOHR, Assistant Examiner

U.S. Cl. X.R.

356—156